(12) United States Patent
Toyonaga et al.

(10) Patent No.: US 9,004,834 B2
(45) Date of Patent: Apr. 14, 2015

(54) FEMALE SCREW COMPONENT AND FASTENING COMPONENT UTILIZING THE SAME

(75) Inventors: Seiichi Toyonaga, Toyota (JP); Satoshi Fujiura, Hekinan (JP); Kouichirou Kouguchi, Toyota (JP); Yoshihiro Murase, Motosu (JP); Satoshi Konagaya, Kani (JP); Masahito Iwata, Seto (JP); Sadayoshi Hasegawa, Inazawa (JP)

(73) Assignees: Aoyama Seisakusho Co., Ltd., Niwa-Gun (JP); Toyota Jidosha Kabushiki kaisha, Toyota-Shi (JP)

( * ) Notice: Subject to any disclaimer, the term of this patent is extended or adjusted under 35 U.S.C. 154(b) by 234 days.

(21) Appl. No.: 13/201,097

(22) PCT Filed: Mar. 15, 2010

(86) PCT No.: PCT/JP2010/001817
§ 371 (c)(1),
(2), (4) Date: Aug. 11, 2011

(87) PCT Pub. No.: WO2010/106775
PCT Pub. Date: Sep. 23, 2010

(65) Prior Publication Data
US 2011/0318136 A1 Dec. 29, 2011

(30) Foreign Application Priority Data
Mar. 16, 2009 (JP) .................. 2009-062598

(51) Int. Cl.
*F16B 37/00* (2006.01)
*F16B 35/04* (2006.01)

(52) U.S. Cl.
CPC ............... *F16B 35/047* (2013.01); *F16B 37/00* (2013.01)

(58) Field of Classification Search
USPC ......................................... 411/386, 437, 427
See application file for complete search history.

(56) References Cited

U.S. PATENT DOCUMENTS 447,775 A * 3/1891 Higbee .......................... 411/436
561,913 A * 6/1896 Paquette ........................ 411/437
(Continued)

FOREIGN PATENT DOCUMENTS

| DE | 26 34 525 A1 | 2/1978 |
| EP | 1 302 678 A2 | 4/2003 |
(Continued)

OTHER PUBLICATIONS

Extended European Search Report dated Oct. 11, 2012.

*Primary Examiner* — Flemming Saether
(74) *Attorney, Agent, or Firm* — Burr & Brown, PLLC

(57) ABSTRACT

A female thread member capable of preventing seizing caused by inclined insertion, and being smoothly fastened from any directions in which a bolt is inserted, and a fastening member using the female thread member. A non-thread portion is formed on an inner peripheral surface of a female thread member body having a female thread for a length corresponding to at least one pitch from an end surface on a bolt-inserting side, and a projection which comes into contact with a flank surface of a male thread of an inserted bolt is formed on a line extending from a helical line of the female thread. The female thread member is used in combination with the bolt having no incomplete thread portion, and there is no adverse possibility of seizing regardless of any directions in which the bolt is inserted.

4 Claims, 13 Drawing Sheets

(56) References Cited

U.S. PATENT DOCUMENTS

| | | | |
|---|---|---|---|
| 2,564,029 A * | 8/1951 | Peterson | 411/366.1 |
| 3,886,989 A * | 6/1975 | Strange | 411/303 |
| 4,907,930 A * | 3/1990 | Peterson | 411/437 |
| 5,320,467 A | 6/1994 | Erbes | |
| 5,609,455 A | 3/1997 | McKewan | |
| 6,334,747 B1 | 1/2002 | Torisu et al. | |
| 7,670,091 B2 * | 3/2010 | Kato | 411/386 |

FOREIGN PATENT DOCUMENTS

| | | |
|---|---|---|
| JP | 07-098009 A1 | 4/1995 |
| JP | 10-274227 A1 | 10/1998 |
| JP | 2000-145741 A1 | 5/2000 |
| JP | 2001-099119 A1 | 4/2001 |
| JP | 2004-044767 A1 | 2/2004 |
| JP | 2005-030580 A1 | 2/2005 |

* cited by examiner

FEMALE SCREW COMPONENT AND FASTENING COMPONENT UTILIZING THE SAME

BACKGROUND OF THE INVENTION

1. Field of the Invention

The present invention relates to, a female thread member used for fastening various components, and to a fastening member using the female thread member.

2. Description of the Related Art

For example, in an assembling process of automobiles, there is widely employed a fastening method in which a female thread member such as a nut is welded to one of components and the other component is fixed by a bolt. At that time, if the bolt is inserted from an inclined direction with respect to an axis of the female thread member, a male thread of the bolt does not properly engage with a female thread of the female thread member. Thus, thread ridges of the male and the female threads bump against each other. In this situation, if the bolt is forcedly rotated by an electric tool or the like, seizing may occur. If such a state occurs, it also becomes difficult to reversely rotate the bolt and a serious problem occurs.

Such seizing caused by inclined insertion occurs at incomplete thread portions formed at thread ridge-leading ends of the bolt and the female thread member. This is because that the incomplete thread portion of the bolt has a smaller diameter than that of its complete thread portion and the incomplete thread portion of the female thread member has a larger diameter than that of its complete thread portion and thus, pitches of the threads of the bolt and the female thread member are deviated from each other and in this state, the thread ridges therebetween can mesh with each other. On the other hand, at the complete thread portions of the bolt and the female thread member, if the pitches thereof are deviated from each other, their thread ridges do not mesh with each other and the seizing is not occurred. From this fact, it is conceivable that the seizing caused by inclined insertion can be prevented by eliminating the incomplete thread portions of the bolt and the female thread member, and by forming the thread ridge-leading ends into a sharply rising shape.

For example, a patent document 1 discloses a female thread member in which a cutting-start portion of the female thread is formed into a stand-up surface and the incomplete thread portion is eliminated. However, if a bolt having no incomplete thread portion is fastened to such a female thread member, it is found that stand-up surfaces of the bolt and the female thread member at thread ridge-leading ends bump against each other depending upon the inclination direction of the bolt with respect to the axis of the female thread member, and the bolt can not smoothly be inserted in some cases.

More specifically, when the stand-up surface at the thread ridge-leading end of the female thread member is located at 12 o'clock position of a clock and the bolt is inclinedly inserted from 12 o'clock position in FIG. 1, the male thread of the bolt first comes into contact with the female thread on the side of 12 o'clock position where the stand-up surface exists. Hence, a flank surface of the male thread of the bolt properly rides on the flank surface of the female thread, and even if the bolt is further rotated as shown with an arrow in FIG. 2, the male thread of the bolt normally threadedly engages with the female thread of the female thread member, and the stand-up surfaces at the thread ridge-leading ends of the bolt and the female thread member do not bump against each other.

On the other hand, when the bolt is inclinedly inserted from a direction of 6 o'clock which is on the side opposite to the stand-up surface, the male thread of the bolt comes into contact with the female thread on the side of 6 o'clock position which is the side opposite to the stand-up surface. Thus, if the bolt is further rotated as shown with an arrow in FIG. 3, the stand-up surfaces between the thread ridge-leading ends of the bolt and the female thread member will bump against each other in accordance with an inclination angle of the bolt. Further, when the bolt is inserted from a direction of 3 o'clock position or 9 o'clock position, there is also a possibility that the stand-up surfaces at the thread ridge-leading ends will bump against each other. Therefore, it is found the problem that the leading end surfaces bump against each other depending upon the inserting direction of the bolt cannot be solved merely by forming the cutting-start portion of the female thread into the stand-up surface and by eliminating the incomplete thread portion.

PRIOR ART DOCUMENT

Patent Document

Patent Document 1: Japanese Patent Application Laid-open No. 1998-274227

SUMMARY OF THE INVENTION

Therefore, it is an object of the present invention to provide a female thread member capable of solving the conventional problem mentioned above, preventing the seizing caused by the inclined insertion, and smoothly fastening in which the bolt is inserted from any directions, and it is also an object of the invention to provide a fastening member using this female thread member.

According to a first aspect of the present invention, a female thread member is provided to solve the above problem, a non-thread portion is formed on an inner peripheral surface of a female thread member body having a female thread for a length corresponding to at least one pitch from an end surface on a bolt-inserting side, and a projection is formed on an line extending from a helical line of the female thread toward the non-thread portion. According to a second aspect of the present invention, the projection may be a thread ridge, and an incomplete thread portion on its leading end side may be eliminated or shortened. According to a third aspect of the present invention, the female thread member can have a structure such that a position of a leading end of the female thread of the female thread member body and a position of a leading end of the projection may be deviated from each other in a circumferential direction. According to a fourth aspect of the present invention, a leading end of the female thread of the female thread member body may be formed into a stand-up surface having no incomplete thread portion.

A fastening member of the invention is configured such that the above-mentioned female thread member is combined with a bolt having no incomplete thread portion at a cutting-start position of a male thread. It is preferable that the bolt is provided with a guide portion at its tip end.

Effect of the Invention

According to the female thread member of the invention, the projection is formed on the non-thread portion formed on the bolt-inserting side of the female thread member body at the location in the line extending from the helical line of the female thread. Hence, when the bolt is inclinedly inserted from the side where the projection is formed, the male thread of the bolt normally threadedly engages with the female thread of the female thread member due to the same reason as shown in FIG. 2, and the stand-up surfaces at the thread ridge-leading ends of the bolt and the female thread member do not bump against each other.

In addition, when the bolt is inclinedly inserted from a side opposite to the projection, since at least one pitch of the thread other than the projection is the non-thread portion having no female thread, the tip end of the male thread of the bolt is inserted without coming into contact with the female thread of the female thread member, and the tip end first engages with the projection. Hence, the male thread normally threadedly engages with the female thread of the female thread member likewise, and the stand-up surfaces at the thread ridge-leading ends of the bolt and the female thread member do not bump against each other. Further, the projection does not have a portion corresponding to the incomplete thread portion or even if the projection has such a portion, it can extremely be shortened and thus, it is possible to completely prevent the seizing caused by the inclined insertion.

If the position of the leading end of the female thread of the female thread member body and the position of the leading end of the projection are deviated from each other in the circumferential direction, it is possible to reduce a size of the non-thread space formed on the bolt-inserting side in the female thread member body as compared with a structure in which the positions of the leading ends match with each other. Therefore, the function of the projection for guiding the male thread is enhanced, and the inclination of the bolt can be corrected more easily.

MODE FOR CARRYING OUT THE INVENTION

Embodiments of the present invention will be described below.

Figure 1:
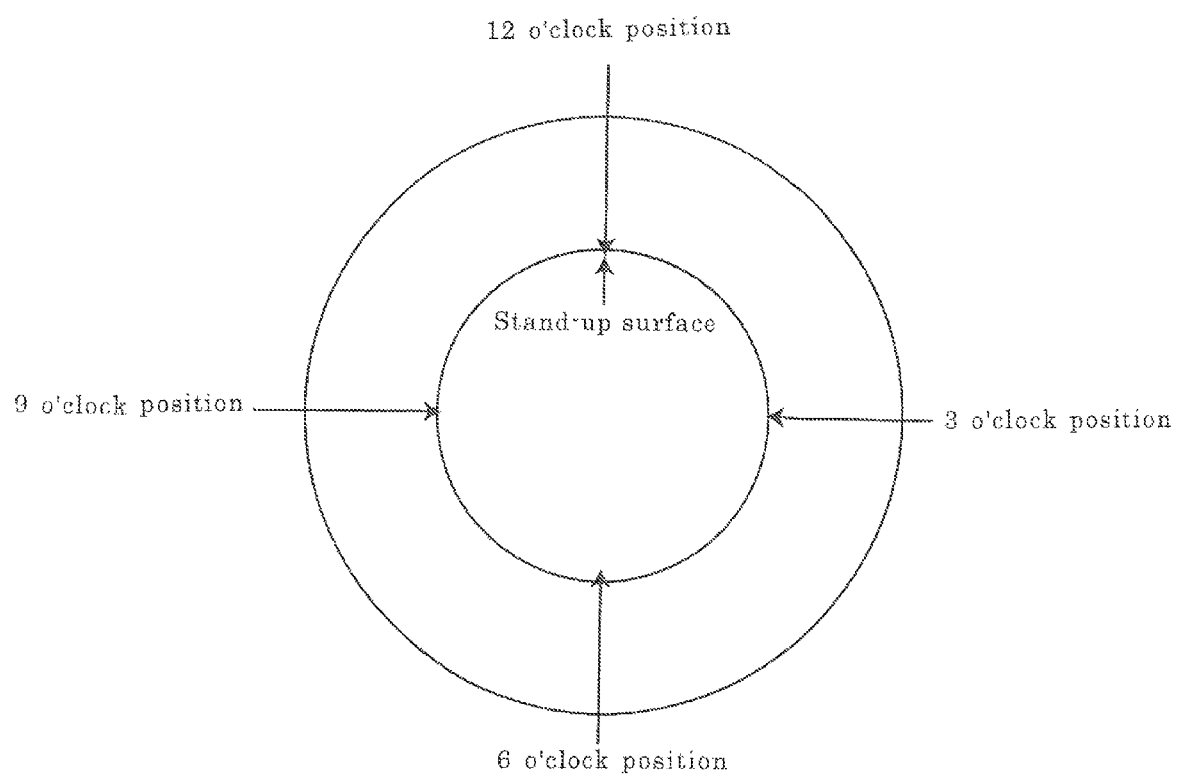
FIG. 1 is a plan view showing a bolt inserting direction with respect to a female thread member.
Figure 2:
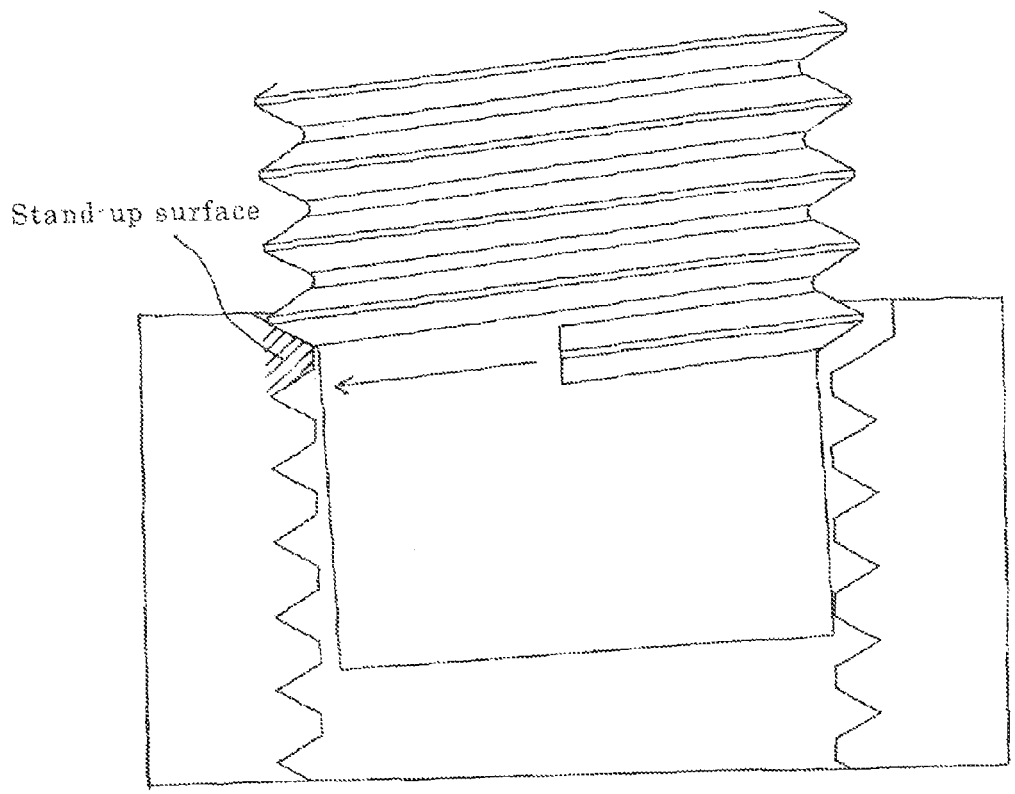
FIG. 2 is a sectional view showing a state where a bolt is inserted from the same direction as that of a stand-up surface of a conventional female thread member.
Figure 3:
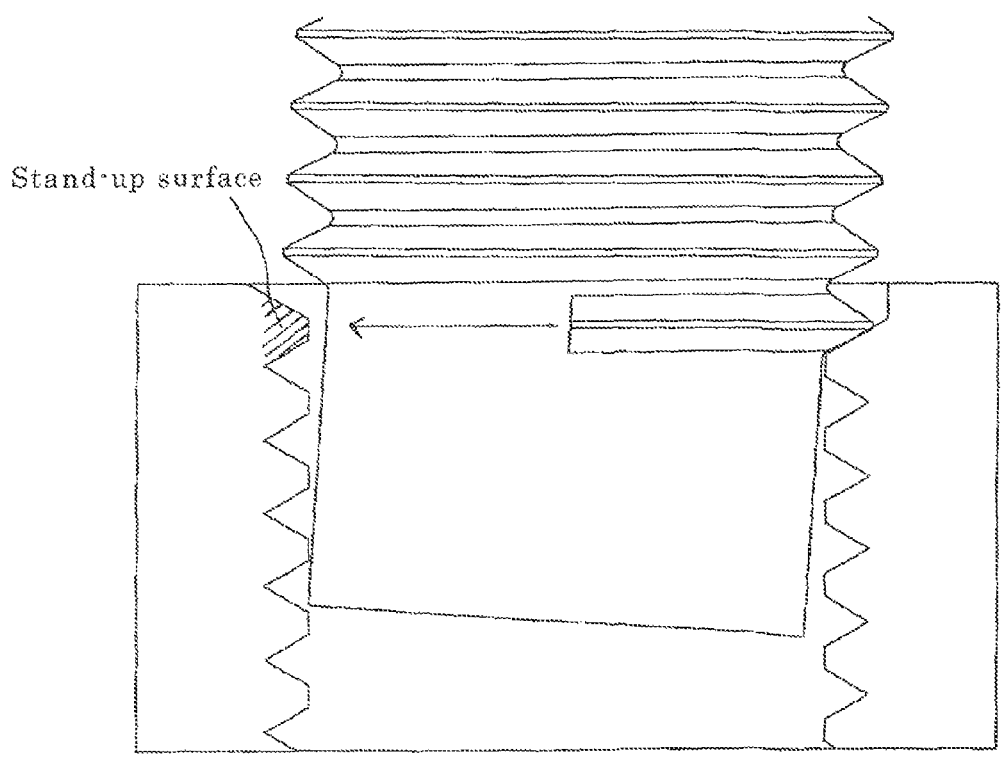
FIG. 3 is a sectional view showing a state where a bolt is inserted from a direction opposite to the stand-up surface of the conventional female thread member.
Figure 4:
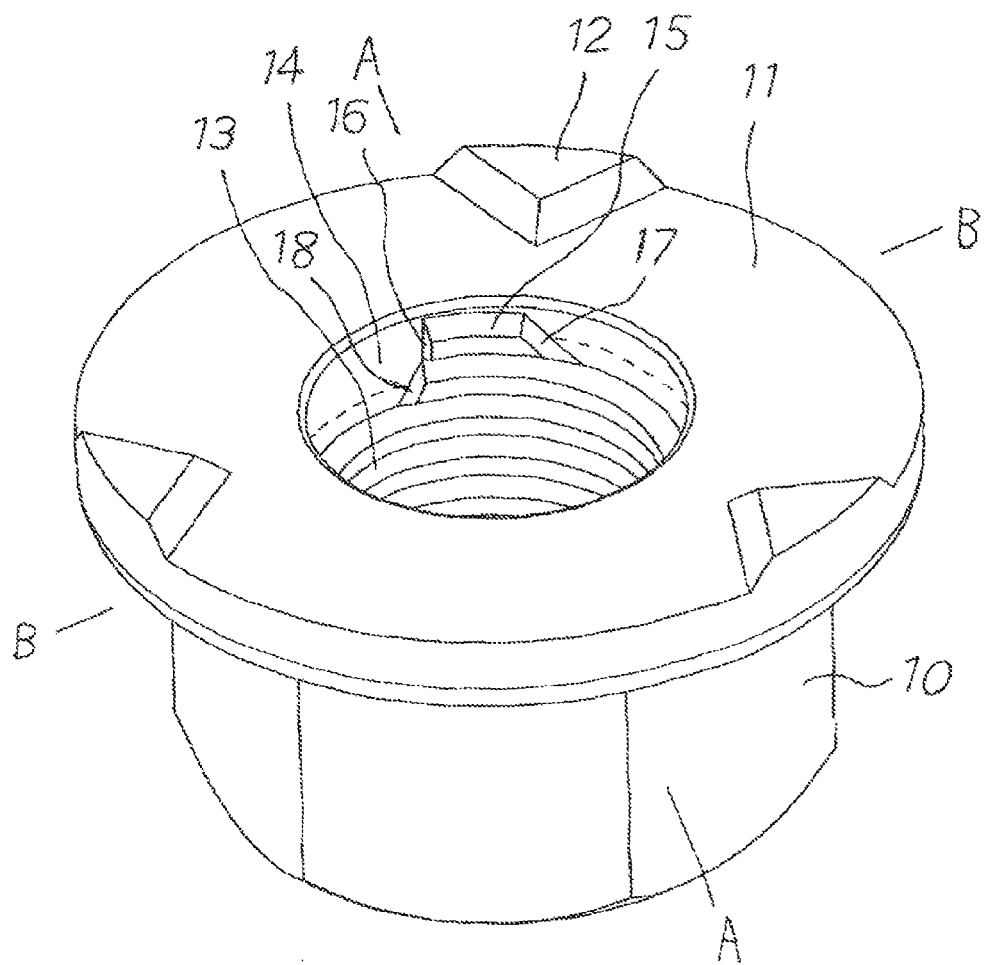
FIG. 4 is a perspective view showing an embodiment in which the present invention is applied to a weld nut member.
Figure 5:
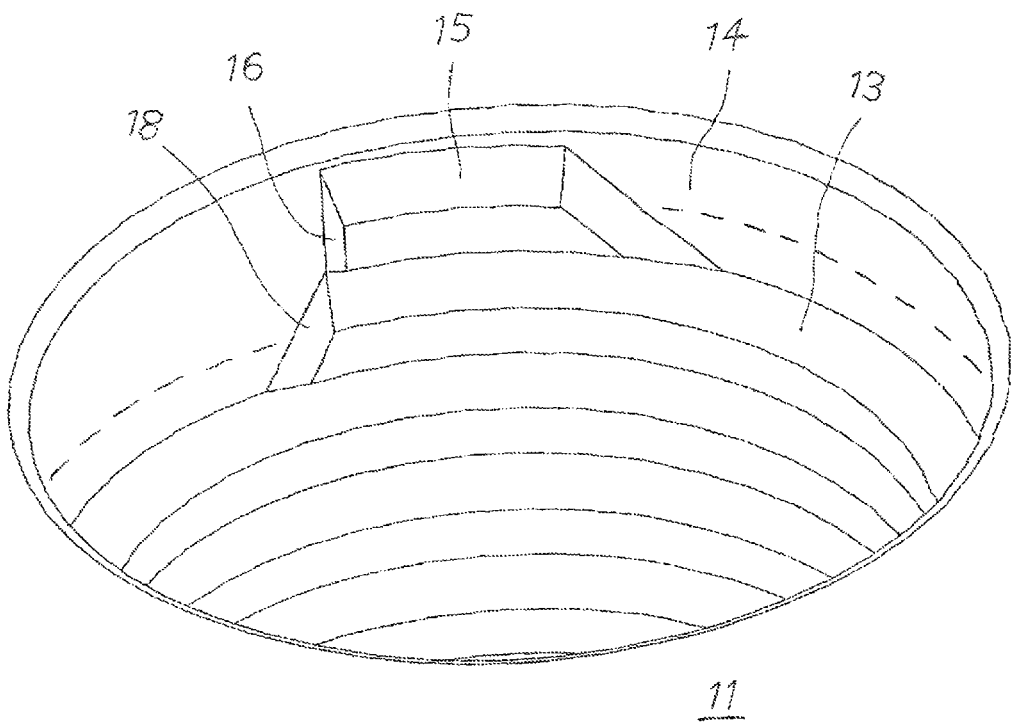
FIG. 5 is an enlarged view of an essential portion in FIG. 4.
Figure 6:
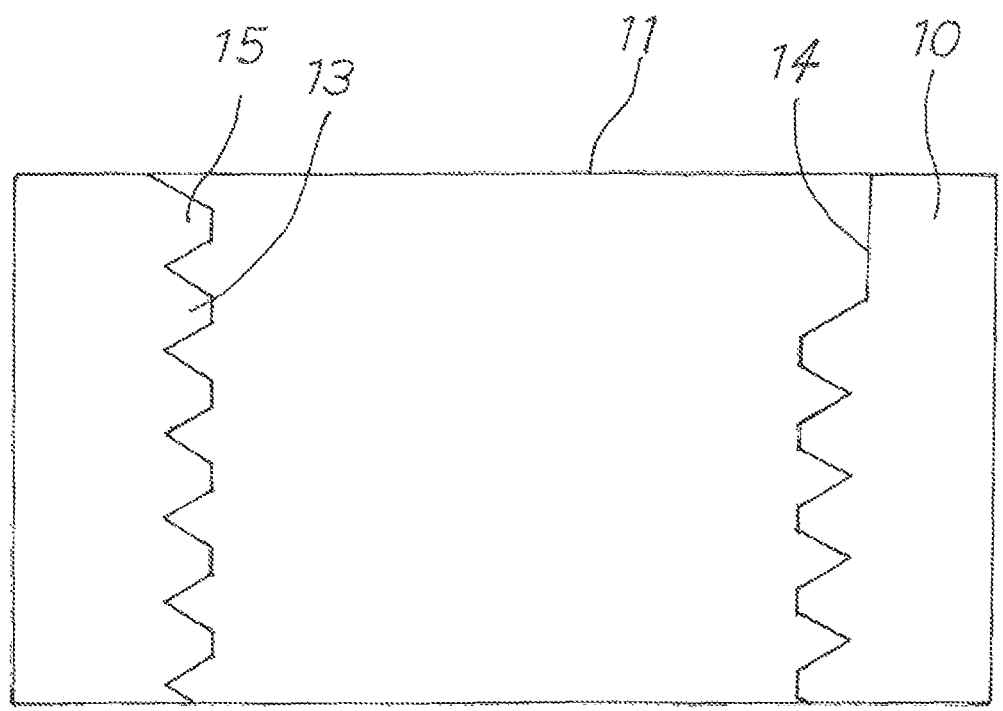
FIG. 6 is a sectional view taken along the line A-A.
Figure 7:
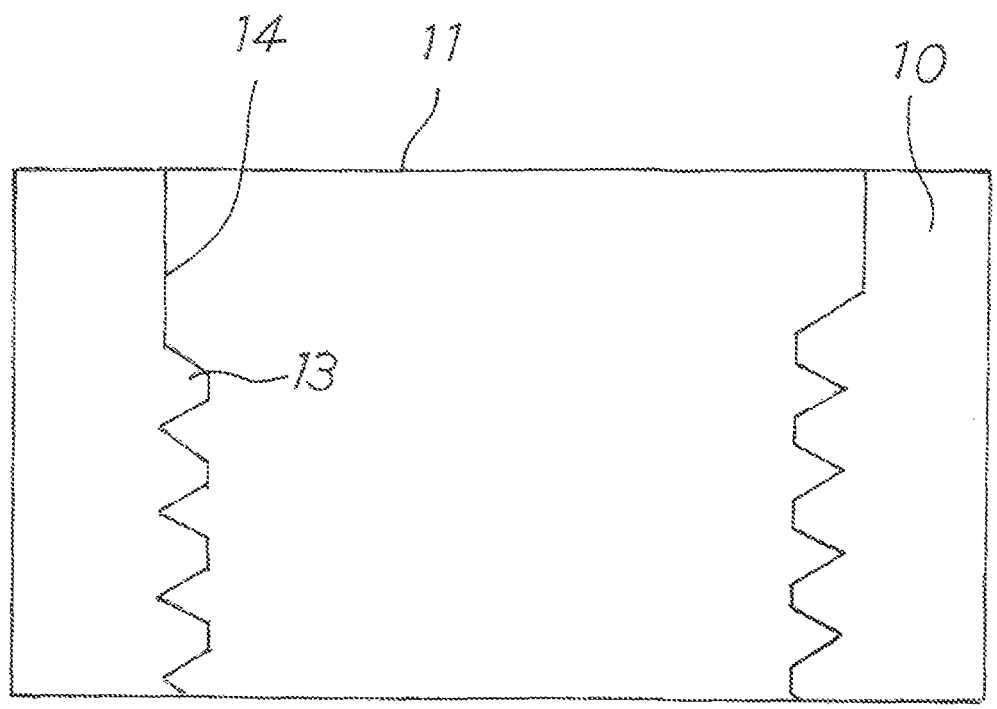
FIG. 7 is a sectional view taken along the line B-B.

FIG. 4 is a perspective view showing an embodiment in which the present invention is applied to a weld nut which is a female thread member. FIG. 5 is an enlarged view of an essential portion thereof. FIG. 6 is a sectional view taken along the line A-A. FIG. 7 is a sectional view taken along the line B-B. A reference number 10 represents a female thread member body, a reference number 11 represents an end surface (seat surface) thereof on a bolt-inserting side, and a reference number 12 represents a welding projection formed on the end surface 11. Although a female thread 13 is formed in an inner peripheral surface of the female thread member body 10, at least one pitch from the end surface 11 is formed as a non-thread portion 14 having no female thread 13.

A projection 15 which engages with a flank surface of a male thread of the bolt is formed on the non-thread portion 14. It is necessary that the projection 15 is located on a line extending from a helical line (shown with broken line) of the female thread 13 toward the non-thread portion 14. A height of the projection 15 preferably matches with a height of the female thread 13. This is because that if the height of the projection 15 is higher than that of the female thread 13, a bolt cannot be inserted, and if the height of the projection 15 is lower than that of the female thread 13, this may cause seizing like the one at the incomplete thread portion.

In this embodiment, the projection 15 has the same shape as that of the thread ridge. A leading end of the projection 15 is formed into a sharp stand-up surface 16 and prevents seizing caused by the incomplete thread portion is prevented. A rear end of the projection 15 may be formed into a slope 17 as illustrated in the drawing.

Although a circumferential length of the projection 15 is not especially limited, if it is too long, a significance of providing the non-thread portion is lowered. Hence, a central angle thereof is preferably from 10 to 30° and in this embodiment, the central angle is about 15°.

A leading end of the female thread 13 is preferably formed into a stand-up surface 18 having no incomplete thread portion. However, for convenience of machining operation; the leading end may be formed into a slightly inclined surface. The stand-up surface 16 of the projection 15 and the stand-up surface 18 of the female thread 13 prevent seizing caused by the incomplete thread portion. Therefore, shapes of the stand-up surface 16 and the stand-up surface 18 are not limited to those illustrated in the drawing only if the incomplete thread portion is eliminated or reduced to a minimum.

Figure 8:
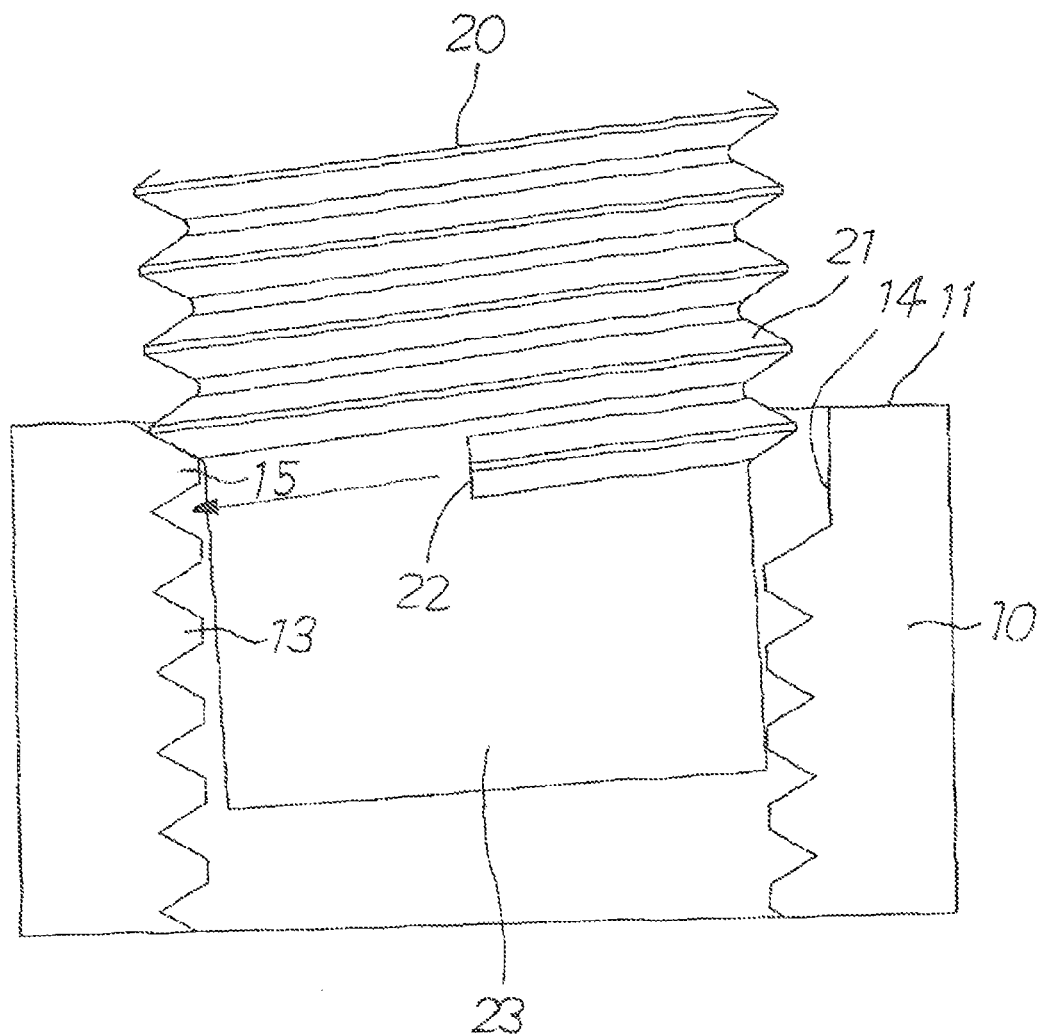
FIG. 8 is a sectional view showing a state where a bolt is inclinedly inserted from a direction in which a projection exists.
Figure 9:
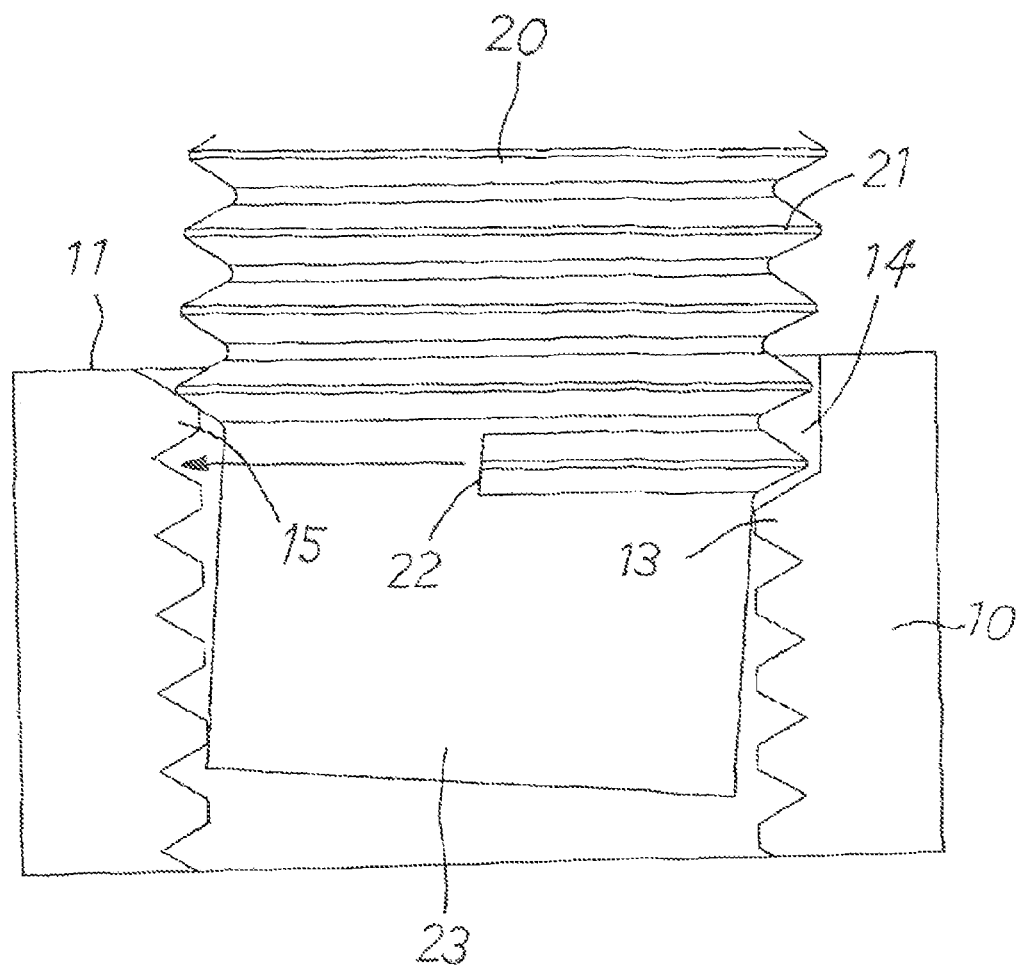
FIG. 9 is a sectional view showing a state where a bolt is inclinedly inserted from a direction opposite to a direction in which the projection exists.

FIGS. 8 and 9 are sectional views showing a fastening member formed by combining the female thread member and a bolt 20. As shown in the drawings, it is preferable that a male thread 21 of the bolt 20 also does not have the incomplete thread portion at its cutting-start position but has a stand-up surface 22 at that position. This is because that if the bolt 20 has the incomplete thread portion, there is a possibility that seizing is occurred. The bolt 20 is preferably provided with a guide portion 23 having no male thread 21 at its tip end. The guide portion 23 is effective in correcting, in an upstanding direction, a posture of the bolt 20 which is inclinedly inserted into the female thread member.

Effects of the present invention will be described below with reference to FIGS. 8 and 9.

FIGS. 8 and 9 are sectional views of the female thread member of the invention taken along a plane passing through the projection 15, and a left side of an upper end of the female thread member is the projection 15. FIG. 8 shows a state where the bolt 20 is inclinedly inserted from a direction in which the projection 15 exists. In this case, the flank surface of the male thread 21 of the bolt 20 first comes into contact with the projection 15 of the female thread member. Hence, when the bolt 20 is further rotated as shown with an arrow in FIG. 8, the male thread 21 of the bolt 20 normally threadedly engages with the female thread 13 of the female thread member, and the stand-up surface 22 at the thread ridge-leading end of the bolt 20, the stand-up surface 16 of the projection 15 of the female thread member and the stand-up surface 18 of the thread ridge-leading end do not bump against each other.

Also when the bolt 20 is inclinedly inserted from a direction opposite to the projection 15 as shown in FIG. 9, since a portion of the female thread member in the vicinity of the end surface 11 is the non-thread portion 14, the male thread 21 of the bolt 20 sinks without coming into contact with the inserting-side female thread 13, and the flank surface of the male thread 21 in the side opposite to the inserting direction first comes into contact with the projection 15 of the female thread member. Hence, when the bolt 20 is further rotated as shown with an arrow in FIG. 9, the male thread 21 of the bolt 20 normally threadedly engages with the female thread 13 of the female thread member, and the stand-up surface 22 at the thread ridge-leading end of the bolt 20, the stand-up surface 16 of the projection 15 of the female thread member and the stand-up surface 18 of the thread ridge-leading end do not bump against each other.

Figure 10:
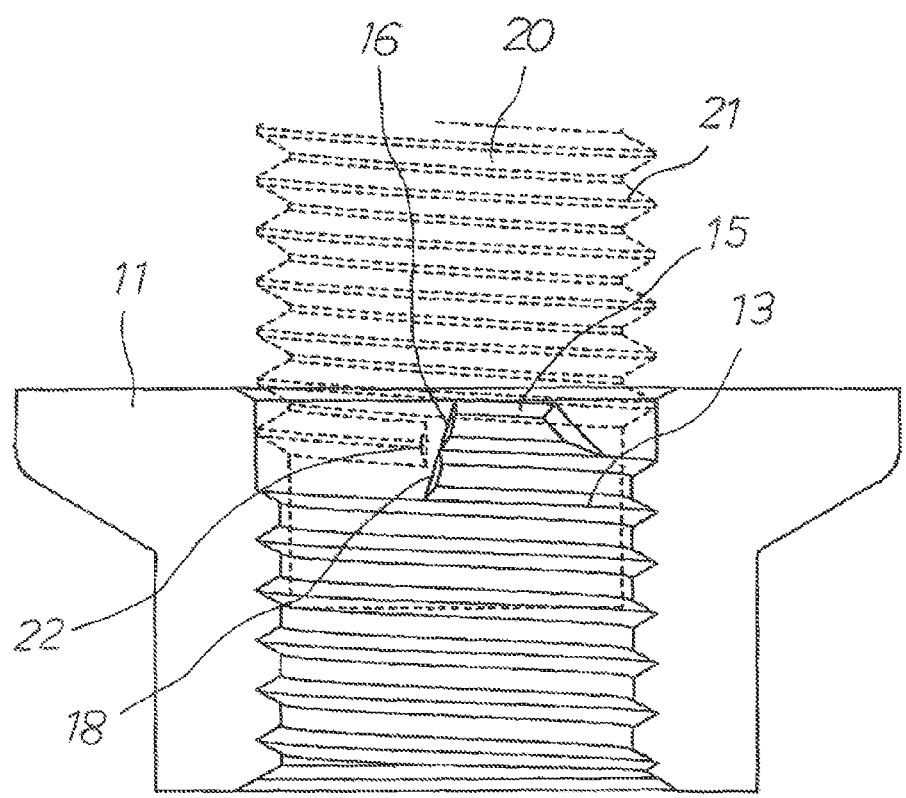
FIG. 10 is another sectional view showing more specifically a state where the bolt is inclinedly inserted.

FIG. 10 shows more specifically a state where the bolt 20 is inclinedly inserted into the female thread member similar to FIG. 9. Although a thread shape of the female thread 13 of the female thread member which can be seen on a deeper side like a normal sectional view is shown with solid lines, the male thread 21 of the bolt 20 shown with broken lines is shown in a state where a back instead of a near side of the bolt is illustrated in a see-through manner. This is because that a shape of a portion of the male thread 21 is to be indicated, wherein the male thread 21 actually comes into contact with the female thread 13 of the female thread member shown in solid line.
is inserted into the female thread member, the flank FIG. 10 shows a state where, when the bolt 20 surface of the male thread 21 first comes into contact with the projection 15 of the female thread member and is positioned, and when the bolt 20 is rotated as it is, the stand-up surface 22 at the thread ridge-leading end of the bolt 20 is nicely fitted in between the stand-up surface 16 at the leading end side of the projection 15 and the stand-up surface 18 at the leading end of the female thread 13 of the female thread member without colliding against them.

According to the present invention, as described above, since the male thread 21 of the inclinedly inserted bolt 20 normally threadedly engages with the female thread 13 of the female thread member, the stand-up surface 22 at the thread ridge-leading end of the bolt 20, the stand-up surface 16 of the projection 15 of the female thread member and the stand-up surface 18 of the thread ridge-leading end do not bump against each other regardless of any directions in which the bolt 20 is inserted. It is especially preferable that the bolt 20 is provided with the guide portion 23 at its tip end, because the guide portion 23 comes into contact with the female thread 13 of the female thread member to correct the posture of the bolt 20. Even when the bolt 20 does not have the guide portion 23, seizing is not generated. Hence, the attitude can manually be corrected and they can be fastened to each other smoothly.

Figure 11:
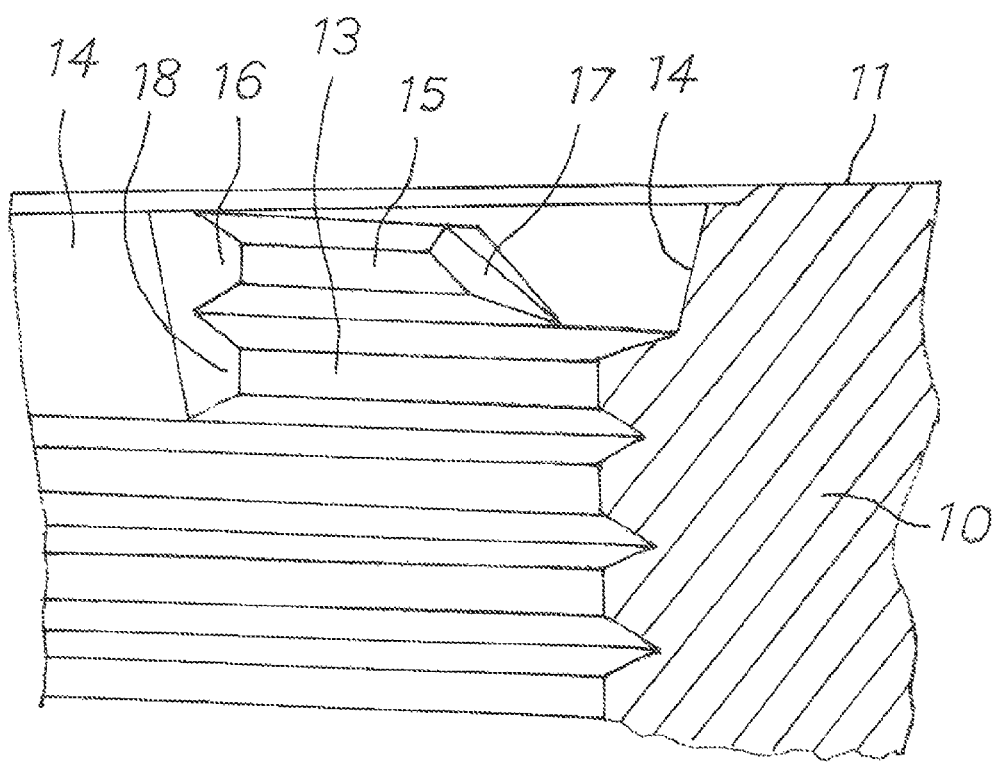
FIG. 11 is a sectional view of an essential portion showing another embodiment of the invention.

In the embodiment, the non-thread portion 14 of the female thread member in the vicinity of the end surface 11 is formed into a cylindrical surface which coaxial with a center axis of the female thread member as shown in FIG. 6. Alternatively, it is also possible to form the non-thread portion 14 into a tapered surface as in another embodiment shown in FIG. 11. Further, the stand-up surface 16 at the leading end side of the projection 15 and the stand-up surface 18 of the thread ridge-leading end may be changed such that they exist on the same plane as shown in FIG. 11. Although it is necessary that the incomplete thread portion of the leading end of the projection 15 is eliminated or reduced to a minimum, the thread ridge-leading end may have a slight incomplete thread portion. A shape of the rear end of the projection 15 is not especially limited, and the rear end may have a slope 17 as shown in FIG. 11.

Figure 13:
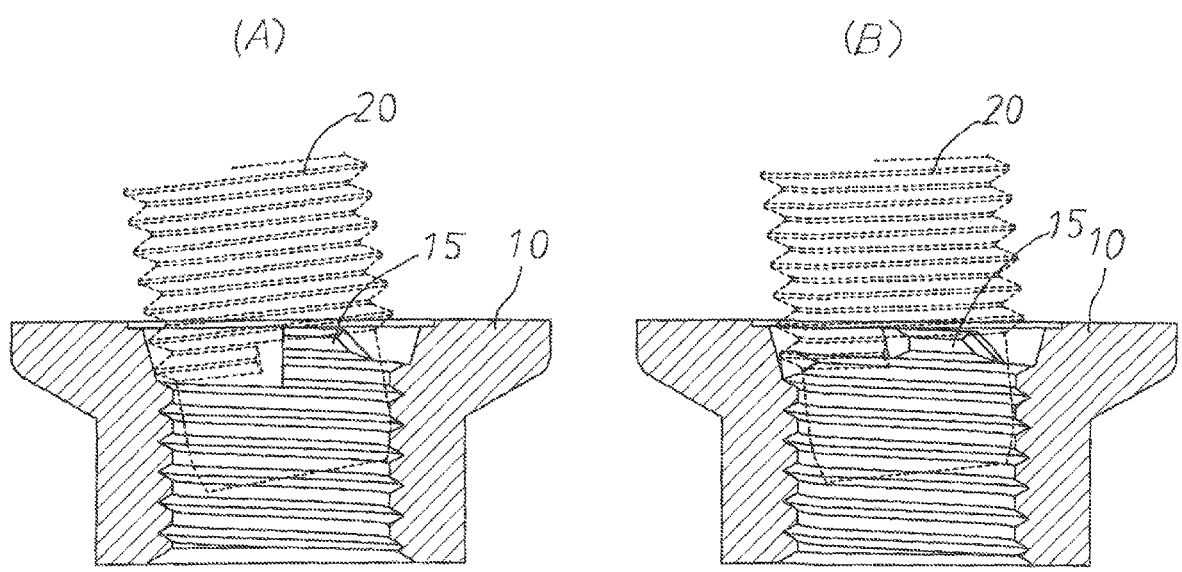
FIG. 13 are explanatory diagrams of function according to another embodiment of the invention.

In the above-described embodiment, a position of the leading end of the female thread 13 of the female thread member body 10 and a position of the leading end of the projection 15 are the same positions in the circumferential direction, and a phase angle between the stand-up surface 16 of the projection 15 and the stand-up surface 18 of the thread ridge-leading end in the circumferential direction is zero. However, according to such a structure, since a large non-thread space is formed on the bolt-inserting side in the female thread member body as shown in FIG. 13(A), play of the bolt 20 in the female thread member body is increased. Hence, when the bolt 20 is fastened by large torque in a state where the bolt 20 is largely inclined in a specific direction, there is a little possibility that the bolt 20 is fastened without sufficiently exerting the guide function of the projection 15, and the male thread 21 of the bolt 20 pushes above the projection 15 and the thread ridge is destroyed.

Figure 12:
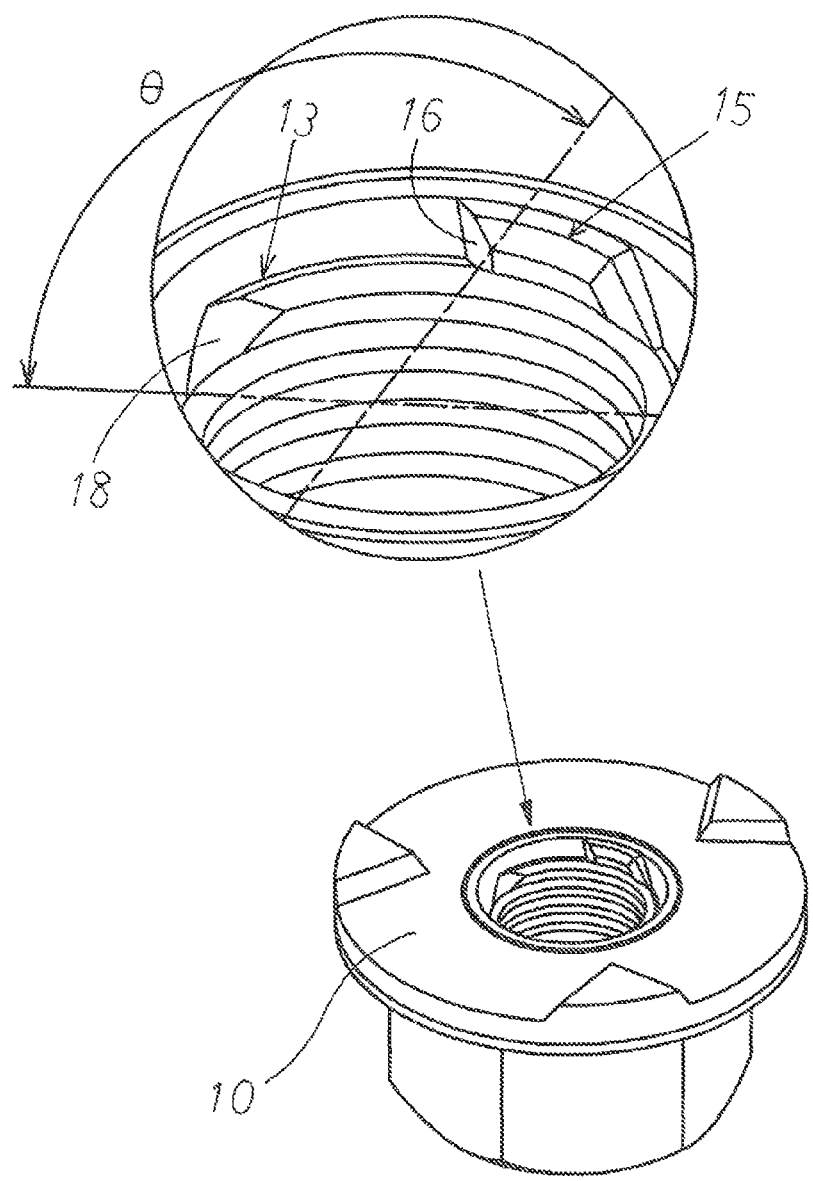
FIG. 12 is a perspective view showing another embodiment of the invention.

To eliminate the possibility that the thread is destroyed, it is effective to deviate the position of the leading end of the female thread of the female thread member body 10 and the position of the leading end of the projection 15 from each other in the circumferential direction as in an embodiment shown in FIG. 12. That is, a phase angle θ is provided between the stand-up surface 16 of the projection 15 and the stand-up surface 18 of the thread ridge-leading end in the circumferential direction. It is preferable that the phase angle θ is in a range of ± (60 to 120)°, and the phase angle θ is 90° in the illustrated embodiment.

According to this structure, it is possible to reduce a size of the non-thread space which is formed on the bolt-inserting side in the female thread member body as compared with a structure in which the phase angle θ is zero, i.e., a structure in which the positions of the leading ends match with each other. Therefore, the function of the projection 15 of guiding the male thread 21 of the bolt 20 is enhanced as shown in FIG. 13(B), and there is a merit that the inclination of the bolt can be corrected more easily.

The present invention is not limited to the weld nut but the invention can widely be applied to other female thread members of course. Materials of the bolt and the female thread member are not necessarily limited to steel, but other materials such as aluminum and cast iron can be used. The invention is effective not only when the bolt is threadedly engaged with a fixed female thread member but also when the female thread member is threadedly engages with a fixed bolt of course.

Explanation of Symbols 10 female thread member body
11 end surface on bolt-inserting side
12 welding projection
13 female thread
14 non-thread portion
15 projection
16 stand-up surface
17 slope
18 stand-up surface
20 bolt
21 male thread 22 stand-up surface
23 guide portion
θ phase angle

The invention claimed is:
1. A fastening member comprising:
a bolt having a stand-up surface at a cutting-start position of a male thread, and
a female thread member, the female thread member comprising
   an end surface including an opening on a bolt inserting side;
   an inner peripheral surface having a cylindrical surface extending for a length corresponding to at least one pitch from the end surface of the opening and a complete female thread having a last complete female thread on the inner peripheral surface, and extending therefrom; and
   a projection axially spaced and helically aligned from the last complete female thread on a line extending from a helical line of the female thread toward the opening, the projection having a leading end and a trailing end, wherein the projection and the last complete female thread have substantially the same thread profile extending from the inner peripheral surface.

2. The fastening member according to claim 1, wherein the thread profile of the projection is a thread ridge, and a leading end side of the thread ridge is eliminated or shortened.

3. The fastening member according to claim 1, wherein a position of a leading end of the last complete female thread of the female thread member and a position of the leading end of the projection are deviated therebetween in a circumferential direction.

4. The fastening member according to claim 1, wherein the bolt is provided with a guide portion at the bolt tip end.

* * * * *